US012743450B2

(12) United States Patent
Nakayama et al.

(10) Patent No.: US 12,743,450 B2
(45) Date of Patent: Sep. 22, 2026

(54) QUERY FORMATTING SYSTEM, QUERY FORMATTING METHOD, AND INFORMATION STORAGE MEDIUM

(71) Applicant: RAKUTEN GROUP, INC., Tokyo (JP)

(72) Inventors: Yuki Nakayama, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 346 days.

(21) Appl. No.: 18/114,984

(22) Filed: Feb. 27, 2023

(65) Prior Publication Data

US 2023/0281229 A1 Sep. 7, 2023

Related U.S. Application Data

(60) Provisional application No. 63/268,702, filed on Mar. 1, 2022.

(51) Int. Cl.

| | |
|---|---|
| ***G06F 40/242*** | (2020.01) |
| ***G06F 16/332*** | (2019.01) |
| ***G06F 40/284*** | (2020.01) |

(52) U.S. Cl.

CPC ........ *G06F 16/3325* (2019.01); *G06F 40/242* (2020.01); *G06F 40/284* (2020.01)

(58) Field of Classification Search

CPC .. G06F 16/3325; G06F 40/242; G06F 40/284; G06N 3/0442; G06N 3/0464; G06N 3/09

See application file for complete search history.

(56) References Cited

U.S. PATENT DOCUMENTS

| | | | | |
|---|---|---|---|---|
| 8,301,437 | B2 * | 10/2012 | Parikh | G06F 16/3344 704/4 |
| 2006/0116862 | A1 * | 6/2006 | Carrier | G06F 40/284 704/1 |
| 2009/0259643 | A1 * | 10/2009 | Peng | G06F 40/284 |
| 2013/0124492 | A1 * | 5/2013 | Gao | G06F 40/232 707/706 |
| 2014/0143254 | A1 * | 5/2014 | Datta | G06F 16/9535 707/E17.089 |
| 2016/0062969 | A1 * | 3/2016 | Mengle | G06F 40/30 704/9 |
| 2016/0299885 | A1 * | 10/2016 | Emanuel | G06F 40/242 |

(Continued)

OTHER PUBLICATIONS

"A Maybe Easy-To-Understand Introduction to Bi-LSTM CRF," online, retrieved from the Internet on Feb. 11, 2022, <URL: https://qiita.com/wakafar/items/c9a05713f579f436d36d> (Cited in the specification p. 1, line 20 to p. 2, line 19).

(Continued)

*Primary Examiner* — Pierre Louis Desir
*Assistant Examiner* — Cody Douglas Hutcheson
(74) *Attorney, Agent, or Firm* — HEA Law PLLC

(57) ABSTRACT

Provided is a query formatting system including at least one processor configured to: acquire a plurality of tokens included in a query; execute matching through use of dictionary data based on the plurality of tokens; and format a second token which fails to match the dictionary data among the plurality of tokens based on a first token which matches the dictionary data among the plurality of tokens and a learning model relating to query formatting.

21 Claims, 7 Drawing Sheets

(56) References Cited

U.S. PATENT DOCUMENTS

| | | | | |
|---|---|---|---|---|
| 2017/0068655 | A1* | 3/2017 | Wang | G06F 40/284 |
| 2019/0266239 | A1* | 8/2019 | Nagano | G06F 40/295 |
| 2020/0050667 | A1* | 2/2020 | Lin | G06F 16/35 |
| 2021/0019309 | A1* | 1/2021 | Yadav | G06F 16/2428 |
| 2021/0397787 | A1* | 12/2021 | Nagvenkar | G06N 3/04 |
| 2022/0197961 | A1* | 6/2022 | Baek | G06F 16/14 |
| 2022/0269857 | A1* | 8/2022 | Carrier | G06F 40/284 |
| 2022/0374602 | A1* | 11/2022 | Park | G06F 40/295 |
| 2023/0007965 | A1* | 1/2023 | Chen | G06F 40/295 |
| 2023/0044266 | A1* | 2/2023 | Nguyen | G06F 16/90335 |

OTHER PUBLICATIONS

Takuya Goino and Tomoki Hamagami, "Named Entity Recognition from Medical Documents by Fine-Tuning BERT," online, retrieved from the Internet on Feb. 11, 2022, <URL: https://www.sice.or.jp/org/isys/is48/paper/SICE-IS_2021_paper_4.pdf> (Cited in the specification p. 1, line 20 to p. 2, line 19).

* cited by examiner

・EXAMPLES OF APPROPRIATE QUERY
Tokyo restaurant
U.S.A. championship

・EXAMPLE OF QUERY WITHOUT SPACE INPUT BETWEEN TOKENS
Tokyorestaurant

・EXAMPLE OF QUERY WITH SPACE INPUT IN ONE TOKEN
U.S.A. champion ship

FIG.5
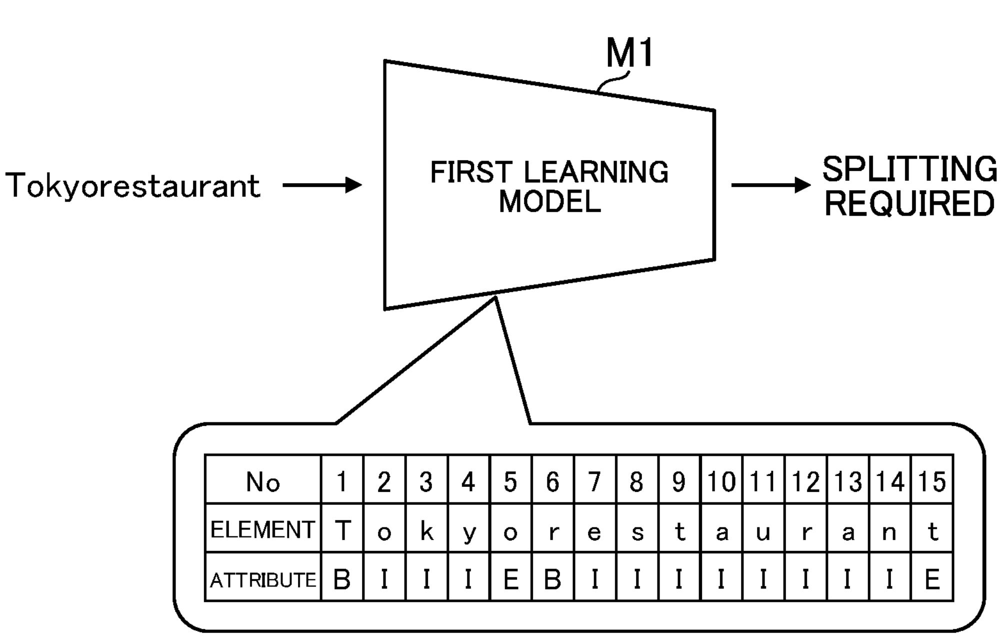
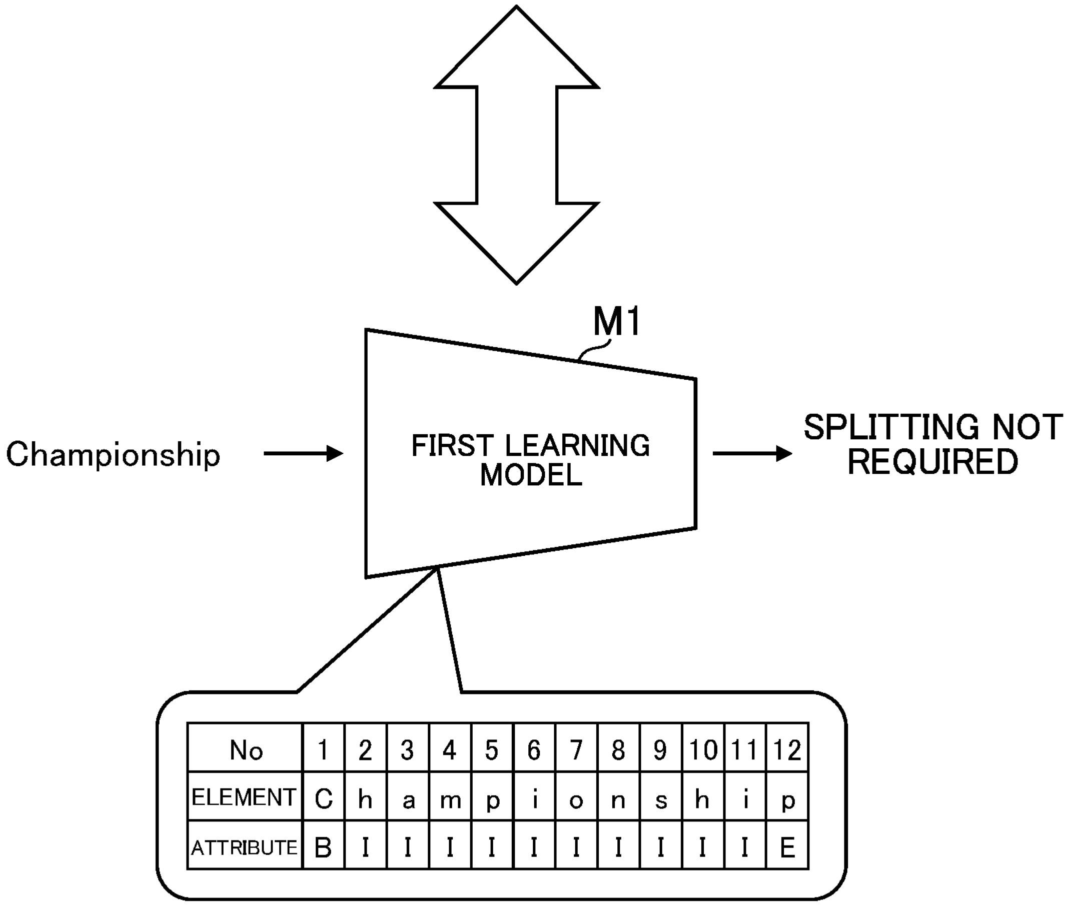

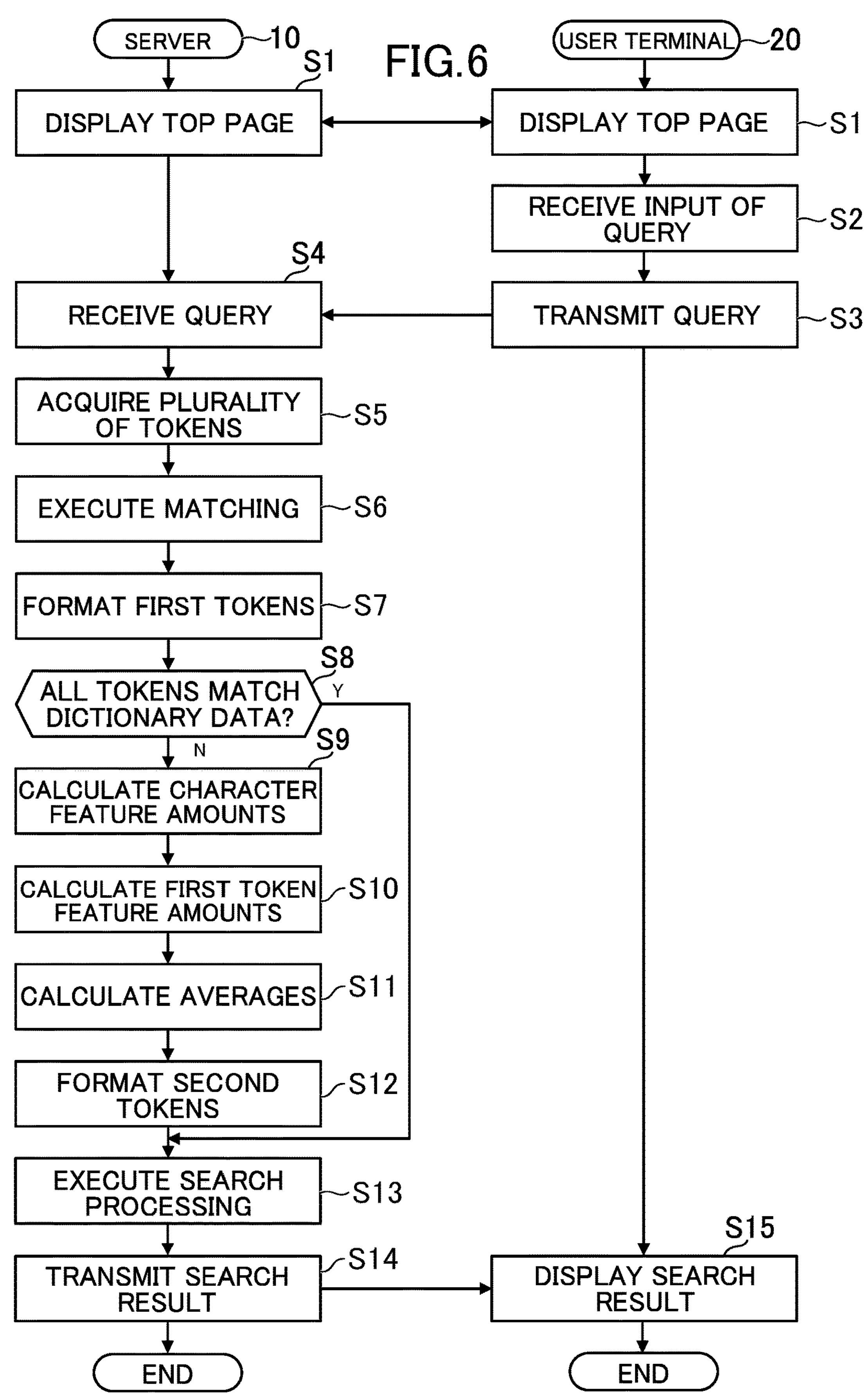
FIG.6
SERVER
10
USER TERMINAL
20
DISPLAY TOP PAGE
S1
DISPLAY TOP PAGE
S1
RECEIVE INPUT OF QUERY
S2
RECEIVE QUERY
S4
TRANSMIT QUERY
S3
ACQUIRE PLURALITY OF TOKENS
S5
EXECUTE MATCHING
S6
FORMAT FIRST TOKENS
S7
ALL TOKENS MATCH DICTIONARY DATA?
S8
Y
N
CALCULATE CHARACTER FEATURE AMOUNTS
S9
CALCULATE FIRST TOKEN FEATURE AMOUNTS
S10
CALCULATE AVERAGES
S11
FORMAT SECOND TOKENS
S12
EXECUTE SEARCH PROCESSING
S13
TRANSMIT SEARCH RESULT
S14
DISPLAY SEARCH RESULT
S15
END
END

QUERY FORMATTING SYSTEM, QUERY FORMATTING METHOD, AND INFORMATION STORAGE MEDIUM

CROSS-REFERENCE TO RELATED APPLICATION

The present application claims priority from the U.S. provisional application No. 63/268,702, filed on Mar. 1, 2022, the disclosures of which are incorporated by reference herein.

BACKGROUND OF THE INVENTION

1. Field of the Invention

The present disclosure relates to a query formatting system, a query formatting method, and an information storage medium.

2. Description of the Related Art

Hitherto, there has been known a technology for executing search processing based on a query. The query can be freely input in principle, and hence a query inappropriate for the search may be input. For example, even when a space is required to be input between a word A and a word B, a space may not be input between the word A and the word B. For example, for a certain reason, a space may be input between characters forming one word. Thus, it is required to appropriately format a query.

For example, a query often contains a named entity, and hence it is considered to use a named entity recognition task to format the query. As an example of the named entity recognition task, there are known technologies as described in "A Maybe Easy-To-Understand Introduction to Bi-LSTM CRF," online, retrieved from the Internet on Feb. 11, 2022, <www.qiita.com/wakafar/items/c9a05713f579f436d36d> and in Takuya Goino and Tomoki Hamagami, "Named Entity Recognition from Medical Documents by Fine-Tuning BERT," online, retrieved from the Internet on Feb. 11, 2022, <www.sice.or.jp/org/i-sys/is48/paper/SICE-IS_2021_paper_4.pdf>. In "Maybe Easy-To-Understand Introduction to Bi-LSTM CRF," there is described Bi-LSTM-CRF which recognizes named entities, such as names of persons and names of places included in a sentence. In "Named Entity Recognition from Medical Documents by Fine-Tuning BERT," there is described BERT-CRF which recognizes named entities, such as names of diseases and symptoms included in medical documents.

SUMMARY OF THE INVENTION

However, the technologies as described in "Maybe Easy-To-Understand Introduction to Bi-LSTM CRF" and "Named Entity Recognition from Medical Documents by Fine-Tuning BERT" assume to recognize named entities included in a sentence having a certain length, and hence cannot recognize named entities included in relatively short queries. Thus, even when the technologies as described in "Maybe Easy-To-Understand Introduction to Bi-LSTM CRF" and "Named Entity Recognition from Medical Documents by Fine-Tuning BERT" are applied to query formatting, an accuracy of the query formatting cannot be increased. The same applies to other named entity recognition tasks in this respect, and the related art has not been able to increase the accuracy of the query formatting.

One object of the present disclosure is to increase an accuracy of query formatting.

According to at least one embodiment of the present disclosure, there is provided a query formatting system including at least one processor configured to: acquire a plurality of tokens included in a query; execute matching through use of dictionary data based on the plurality of tokens; and format a second token which fails to match the dictionary data among the plurality of tokens based on a first token which matches the dictionary data among the plurality of tokens and a learning model relating to query formatting.

BRIEF DESCRIPTION OF THE DRAWINGS

FIG. 5 is a diagram for illustrating an example of output from a first learning model.

FIG. 6 is a flowchart for illustrating an example of processing executed in the query formatting system.

DETAILED DESCRIPTION OF THE INVENTION

[1. Overall Configuration of Query Formatting System]

Figure 1:
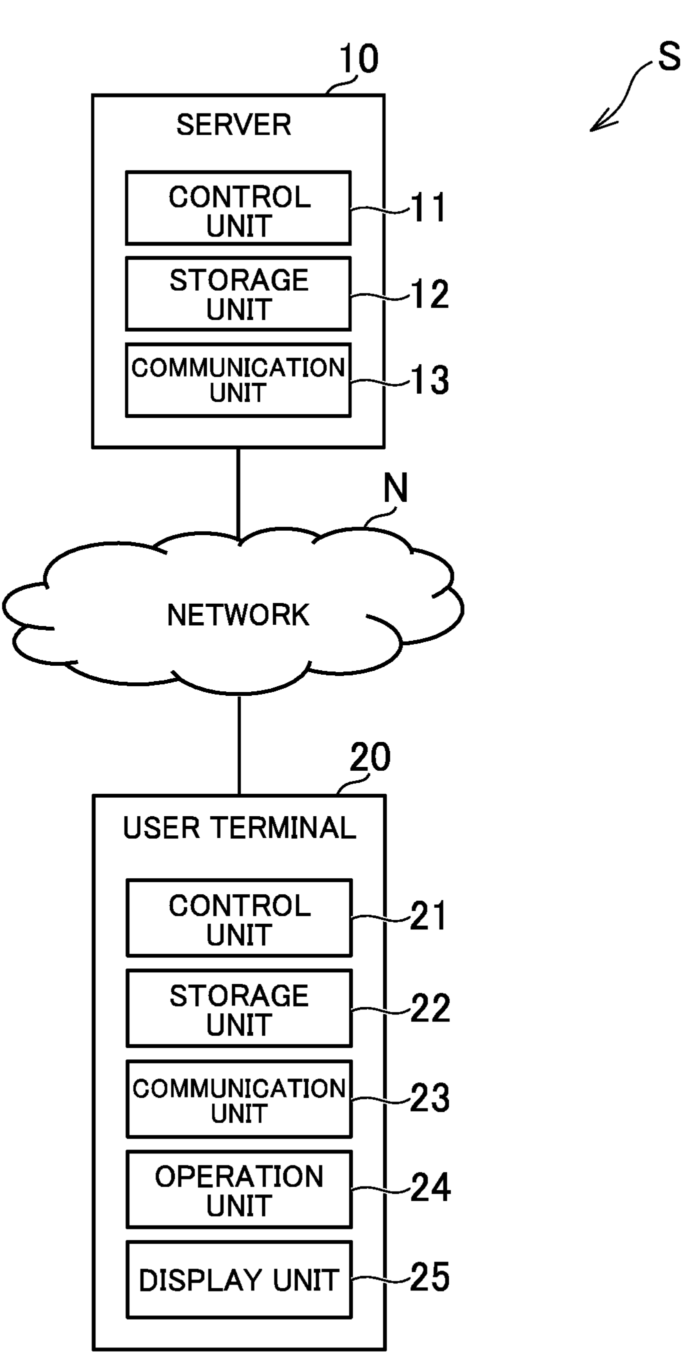
FIG. 1 is a diagram for illustrating an example of an overall configuration of a query formatting system.

Description is now given of an example of at least one embodiment of a query formatting system according to the present disclosure. FIG. 1 is a diagram for illustrating an example of an overall configuration of the query formatting system. A query formatting system S includes a server 10 and a user terminal 20 which are connectable to a network N. The network N is any type of network, such as the Internet or a LAN. It suffices for the query formatting system S to include at least one computer, and the query formatting system S is not limited to the example of FIG. 1.

The server 10 is a server computer. A control unit 11 includes at least one processor. A storage unit 12 includes a volatile memory such as a RAM and a nonvolatile memory such as a hard disk drive. A communication unit 13 includes at least one of a communication interface for wired communication or a communication interface for wireless communication.

The user terminal 20 is a computer for a user. For example, the user terminal 20 is a personal computer, a smartphone, a tablet terminal, or a wearable terminal. Physical configurations of a control unit 21, a storage unit 22, and a communication unit 23 are equivalent to those of the control unit 11, the storage unit 12, and the communication unit 13, respectively. An operation unit 24 is an input device such as a touch panel. A display unit 25 is a liquid crystal display or an organic EL display.

Programs stored in the storage units 12 and 22 may be supplied through the network N. Moreover, each computer may include at least one of a reading unit (for example, a memory card slot) for reading a computer-readable information storage medium or an input/output unit (for example, a USB port) for inputting/outputting data from/to an external device. For example, a program stored in the information storage medium may be supplied through at least one of the reading unit or the input/output unit.

[2. Overview of Query Formatting System]

Figure 2:
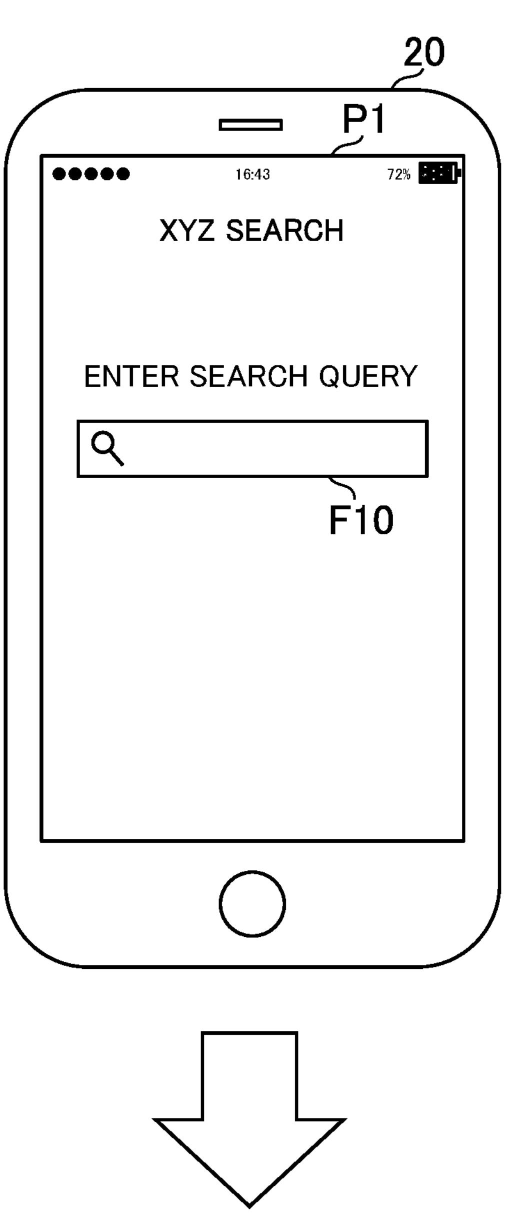
FIG. 2 is a view for illustrating an example of a screen displayed on a user terminal.

FIG. 2 is a diagram for illustrating an example of a screen displayed on the user terminal 20. In the at least one embodiment, there is exemplified a case in which the query formatting system S is applied to a search service for websites. The query formatting system S can be applied to various services. An application example to another service is described later. For example, the user starts a browser or an application of the user terminal 20, to thereby access a top page P1 of the search service.

The server 10 can provide various pages, such as the top page P1 and a page of a search result, to the user. The user inputs any query in an input form F10, to thereby use the search service. In the at least one embodiment, description is given of a case in which the query is input in English, but the query can be input in any language. For example, the query may be input in another language, such as Japanese, Chinese, Spanish, French, or Arabic.

The query is a word input by the user when the search is executed. The word is at least one character, at least one number, at least one symbol, or a combination thereof. The word is sometimes referred to as "keyword." Each letter, number, or symbol forming the word is sometimes referred to as "element." The query may include a search condition (for example, a range of a numerical value and attributes) other than words. The search is executed by comparing the query input by the user and indices stored in the server 10 with each other.

The query includes at least one token. The token is a unit of the words included in the query. The token includes at least one word. The token may be formed of one word or a plurality of words. When the token is formed of a plurality of words, a space may exist between individual words, or a certain symbol, such as an underbar or a hyphen, may be arranged therebetween. In the at least one embodiment, a query including a plurality of tokens is assumed, but a query may include only one token.

For example, it is assumed that the user inputs a query "The South Mountain" in order to search for products of an imaginary apparel brand "The South Mountain." This query includes three words being a word "The," a word "South," and a word "Mountain." Those three words mean the apparel brand name only when those words are treated as one set. Thus, in order to increase accuracy of the search, it is preferred that those three words be treated not as individual tokens, but as one token. This query includes one token formed of the three words. Thus, even when a plurality of words are separated by spaces, the plurality of words may correspond to one token.

Meanwhile, for example, it is assumed that the user inputs a query "Hawaii mountains" in order to search for mountains in Hawaii. This query is formed of two words being a word "Hawaii" and a word "mountains." Unlike the query "The South Mountain," each word in those two words has an independent meaning. Thus, it is not required to treat those words as one set, and it is preferred that those words be treated as independent tokens. This query includes two tokens each formed of one word.

However, at the time when the query is received, it is difficult for the server 10 to identify whether the token is formed of a plurality of words or the token is formed of one word. Thus, it is assumed that the server 10 tentatively considers a portion separated by spaces as a token at the time when the server 10 receives a query. For example, for the query "The South Mountain," the server 10 tentatively considers that this query includes three tokens being a token "The," a token "South," and a token "Mountain." For the query "Hawaii mountains," the server 10 tentatively considers that this query includes two tokens being a token "Hawaii" and a token "mountains."

It is only required for the server 10 to identify portions considered as tokens from the query based on rules defined in advance. The portion tentatively considered as a token is not limited to a portion separated by spaces. For example, the server 10 may identify a portion considered as a token from a query based on a symbol meaning a certain separation. For example, this symbol may be a parenthesis, an underbar, a hyphen, a comma, or a period. Further, the server 10 may identify portions considered as tokens from a query by combining a plurality of rules.

In an example of FIG. 2, a query "Tokyo restaurant" includes a token "Tokyo" and a token "restaurant." A query "U.S.A. championship" includes a token "U.S.A." and a token "championship." Those two individual tokens of those two queries are nouns each having an independent meaning. Such a noun has an independent meaning, and hence search by the nouns combined under the AND condition or the OR condition often causes no problem. Thus, those two queries have spaces inserted at appropriate positions, and are appropriate for tokens for the search.

The space does not exist in the query "Tokyorestaurant," and hence this query includes only one token "Tokyorestaurant." The space is normally required between a noun "Tokyo" and a noun "restaurant," but the space does not exist between those nouns. For example, when the user feels that input of the space is bothering, and hence inputs only characters, or when the user uses voice input, a plurality of words to be separated into a plurality of tokens may become one token. This query does not include a space inserted at an appropriate position, and is thus inappropriate as a token for the search.

A query "U.S.A. champion ship" has a space entered between "champion" and "ship" of "championship" being one noun. Thus, this query includes a token "U.S.A.," a token "champion," and a token "ship," which is different from the query "U.S.A. championship" appropriately input. When the user erroneously inputs a space between "champion" and "ship" or executes copying and pasting from a website or a document file, a query which is required to be treated as one token may be divided into a plurality of tokens. This query does not include a space inserted at an appropriate position, and is thus also inappropriate as a token for the search.

Thus, in the at least one embodiment, query formatting is executed to obtain an appropriate token. The query formatting is to adjust a token tentatively considered as tokens to appropriate tokens. The query formatting is sometimes referred to as "query chunking." In the at least one embodiment, three operations of splitting, merging, and segmentation are exemplified as operations of the query formatting, but the operations of the query formatting may mean only any one or two of those three operations. The operation $o_i$ the query formatting is a way of formatting a query. The operation may also be referred to as "type of the formatting."

The splitting is to split one token into a plurality of tokens. A space is arranged between each pair of the plurality of tokens. To obtain two tokens "Tokyo" and "restaurant" from the above-mentioned one token "Tokyorestaurant" corresponds to the splitting. A space is arranged between "Tokyo" and "restaurant."

The merging is to unify a plurality of tokens into one token. The space between each pair of the plurality of tokens is deleted. To obtain one token "championship" from the above-mentioned two tokens "champion" and "ship" corresponds to the merging. The space between "champion" and "ship" is deleted.

The segmentation is the same as the merging in terms of such a point that a plurality of tokens is unified into one token, but is different from the merging in such a point that spaces are not deleted. To form one token "The South Mountain" from the above-mentioned three tokens "The," "South," and "Mountain" corresponds to the segmentation. The space between "The" and "South" and the space between "South" and "Mountain" are not deleted.

The query formatting system S executes not query formatting such as general morpheme analysis, but novel query formatting which effectively combines a matching method which uses dictionary data and a machine learning method which uses learning models, to thereby increase accuracy of the query formatting. Description is now given of details of the at least one embodiment.

[3. Functions Implemented by Query Formatting System]

Figure 3:
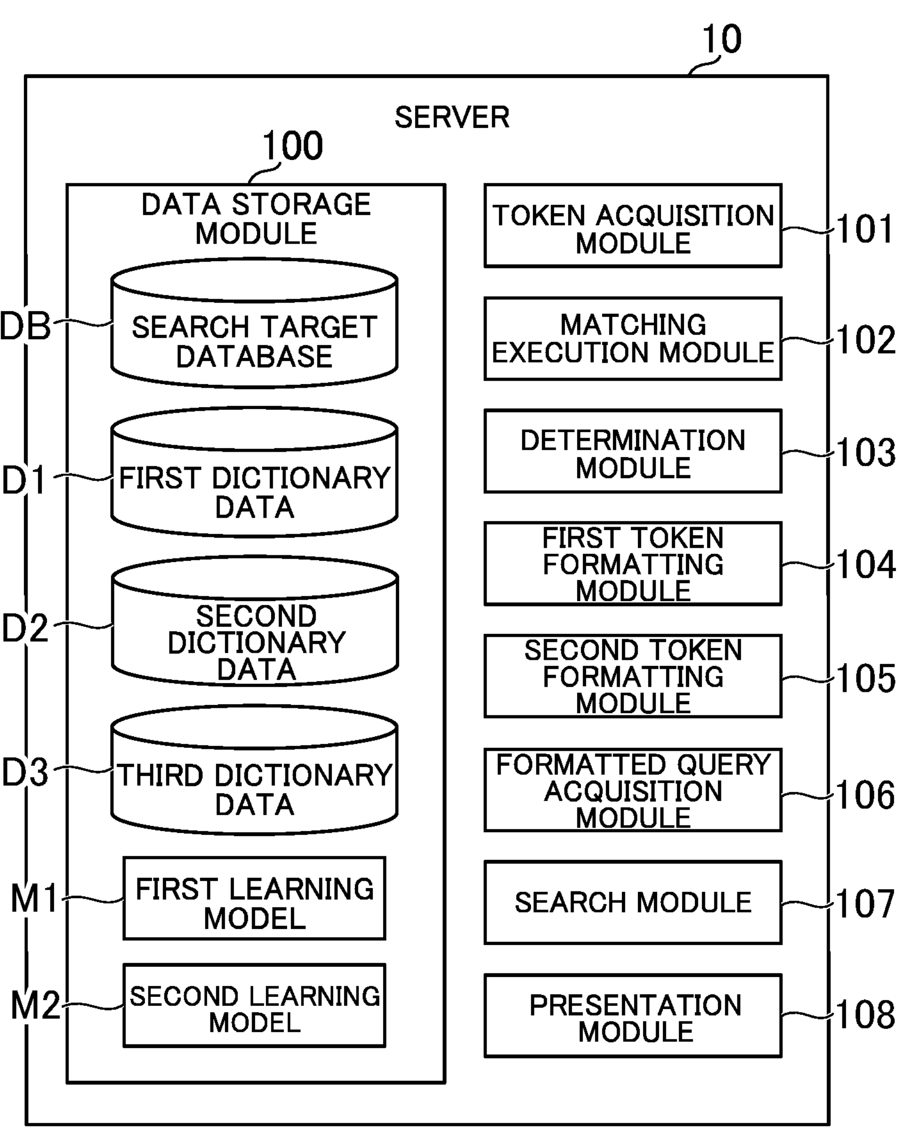
FIG. 3 is a functional block diagram for illustrating an example of functions implemented in at least one embodiment of the present disclosure.
Figure 4:
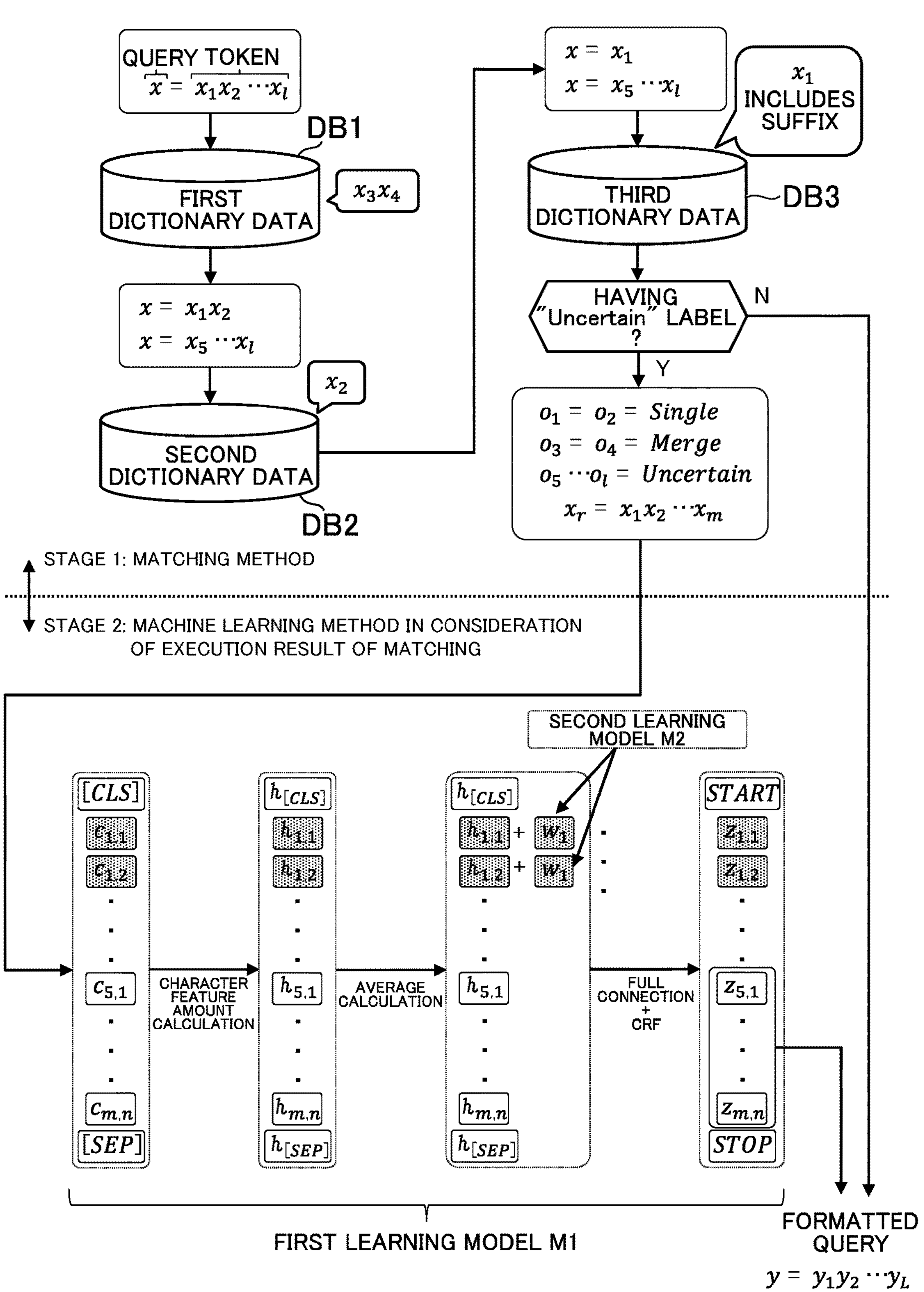
FIG. 4 is a diagram for illustrating an example of an overall flow in the query formatting system.

FIG. 3 is a functional block diagram for illustrating an example of functions implemented in the at least one embodiment. FIG. 4 is a diagram for illustrating an example of an overall flow in the query formatting system S. Description is now given of details of each function of FIG. 3 while referring to the flow of FIG. 4. As illustrated in FIG. 4, the processing of the query formatting is roughly divided into two stages. A stage 1 corresponds to the matching method. A stage 2 corresponds to the machine learning method in consideration of an execution result of the matching at the stage 1.

In the at least one embodiment, the matching method at the stage 1 and the machine learning method at the stage 2 are implemented by each function of FIG. 3. For example, a data storage module 100 is implemented mainly by the storage unit 12. A token acquisition module 101, a matching execution module 102, a determination module 103, a first token formatting module 104, a second token formatting module 105, a formatted query acquisition module 106, a search module 107, and a presentation module 108 are implemented mainly by the control unit 11.

[Data Storage Module]

The data storage module 100 stores data required for the query formatting. For example, the data storage module 100 stores a search target database DB, first dictionary data D1, second dictionary data D2, third dictionary data D3, a first learning model M1, and a second learning model M2. The first dictionary data D1, the second dictionary data D2, and the third dictionary data D3 are hereinafter simply referred to as "dictionary data D" when the first dictionary data D1, the second dictionary data D2, and the third dictionary data D3 are not distinguished from one another. Similarly, the first learning model M1 and the second learning model M2 are hereinafter simply referred to as "learning models M" when the first learning model M1 and the second learning model M2 are not distinguished from each other.

The search target database DB is a database which stores data to be searched for. The search target database DB stores indices to be compared with a query. In the at least one embodiment, websites correspond to the search targets, and hence indices including words extracted from various websites are stored. When the websites are categorized, the categories also correspond to indices. Information itself that can be used as the indices may be publicly-known various types of information. For example, in the search target database DB, the indices of the websites and URLs of the websites are stored in association with each other.

The dictionary data D is data storing words appropriate as tokens for the search. The words stored in the dictionary data D may be formed of only one word or may include a plurality of words. For example, when the imaginary apparel brand "The South Mountain" is required to be considered as one token, those three words are stored as one word in the dictionary data D. As the dictionary data D itself, publicly-known various types of dictionary data D can be used. For example, the dictionary data D may be created based on data of an English dictionary or an Internet encyclopedia. Tokens included in queries input frequently may be stored in the dictionary data D.

In the at least one embodiment, there is exemplified a case in which the three pieces of dictionary data D being the first dictionary data D1, the second dictionary data D2, and the third dictionary data D3 are used. The dictionary data D used for the matching method at the stage 1 is not limited to the example in the at least one embodiment. For example, only one piece of dictionary data D may be used, or two or four or more pieces of dictionary data D may be used.

For example, the first dictionary data D1 stores words frequently used in a certain specific field. The second dictionary data D2 stores general words listed in the Internet encyclopedia. The third dictionary data D3 stores at least one of words corresponding to prefixes, words corresponding to suffixes, or words having co-occurrence. It is assumed that the first dictionary data D1, the second dictionary data D2, and the third dictionary data D3 are created by an administrator of the query formatting system S, but may be dictionary data published on the Internet.

The learning models M are models which use machine learning. As the machine learning itself, various methods used for natural language processing can be used. For example, supervised learning, semi-supervised learning, or unsupervised learning may be used. The learning model M is sometimes referred to as "artificial intelligence (AI)." For example, as the learning model M, a natural language processing model trained in advance based on Transformer such as CharacterBERT, or a character-based convolutional neural network (CNN) may be used. Moreover, for example, as the learning model M, another method, such as Bi-LSTM, Bi-LSTM-CRF, or Word2Vec, may partially be used. Further, BERT and ELECTRA based on the Transformer model may be used.

In the at least one embodiment, there is exemplified a case in which the two learning models M being the first learning model M1 and the second learning model M2 are used. The learning models M used for the machine learning method at the stage 2 are not limited to the example in the at least one embodiment. For example, only one learning model M may be used, or three or more learning models M may be used. When a plurality of learning models M are used, the machine learning methods of the respective learning models M may be different from one another.

For example, the first learning model M1 is a fine-tuned CharacterBERT. For example, the first learning model M1 is a model used in a method for solving so-called sequence labeling problem. Each character included in a token is input to the first learning model M1. The first learning model M1 calculates a character feature amount relating to a feature of each character. When a certain token includes five characters, five character feature amounts are calculated. The feature amount itself can be calculated through publicly known various calculation methods. The feature amount can be expressed in any format, and can be expressed in, for example, a multi-dimensional vector, an array, or a single numerical value. The feature amount is also referred to as "embedded representation." The first learning model M1 may output the character feature amount as a final output, or may output the character feature amount as an intermediate calculation result for obtaining the final output.

For example, the second learning model M2 calculates a token feature amount relating to not a feature amount of each character, but a feature amount of a token itself. The token feature amount is different from the character feature amount in such a sense that the token feature amount is not a feature amount of each character included in a token, but is a feature amount of the entire token. However, the meaning itself of the feature amount of the token feature amount is the same as that of the character feature amount. The token feature amount can also be expressed in any format, and can be calculated through publicly-known various calculation methods. It is only required that the second learning model M2 be a model which can calculate a feature amount of a string having a certain length, and may be Bi-LSTM, Bi-LSTM-CRF, or Word2Vec. The second learning model M2 may output the token feature amount as a final output, or may output the token feature amount as an intermediate calculation result for obtaining the final output.

[Token Acquisition Module]

The token acquisition module 101 acquires a plurality of tokens included in a query. The token acquisition module 101 identifies, based on a method determined in advance, separation positions of the tokens in the query. In the at least one embodiment, the case in which the tokens are separated by spaces is described, and hence the token acquisition module 101 identifies positions of the spaces included in the query, to thereby acquire the plurality of tokens from the query. When the tokens are separated not by spaces, but by specific symbols, the token acquisition module 101 may acquire the plurality of tokens from the query based on positions of this symbol included in the query.

In the at least one embodiment, there is exemplified a case in which the token acquisition module 101 acquires a plurality of tokens included in a query input by the user from the user terminal 20, but the token acquisition module 101 may acquire a plurality of tokens included in a query input in the past from a database storing this query. A query may include only one token, and hence the token acquisition module 101 may acquire the only one token included in the query. Even when a query includes a plurality of tokens, the token acquisition module 101 may acquire only some of the tokens included in the query.

[Matching Execution Module]

The matching execution module 102 executes the matching through use of the dictionary data D based on a plurality of tokens. The matching is to compare the plurality of tokens and the words stored in the dictionary data D. In the at least one embodiment, description is given of a case in which the comparison between each token and the words stored in the dictionary data D corresponds to the matching, but a comparison between a plurality of tokens considered as a group and the words stored in the dictionary data D may correspond to the matching.

In the at least one embodiment, the plurality of pieces of dictionary data D are prepared, and hence the matching execution module 102 executes the matching through use of each of the plurality of pieces of dictionary data D. When only one piece of dictionary data D is prepared, the matching execution module 102 executes the matching through use of the only one piece of dictionary data D. The matching execution module 102 classifies, through the matching, each of the plurality of tokens as any one of a first token or a second token.

The first token is a token which matches the dictionary data D. When the plurality of pieces of dictionary data D are prepared as in the at least one embodiment, the first token is a token which matches at least one of the plurality of pieces of dictionary data D. In the at least one embodiment, it is assumed that a token which matches any one of the plurality of pieces of dictionary data D is classified as the first token, but matching the number of pieces of dictionary data D which is equal to or larger than a threshold value may be a condition for the classification as the first token. This threshold value may be two or more. This threshold value may be specified by the administrator of the query formatting system S.

The second token is a token which fails to match the dictionary data D. When the plurality of pieces of dictionary data D are prepared as in the at least one embodiment, the second token is a token which fails to match any of the plurality of pieces of dictionary data D. When a value of two or more is set as the threshold value of the condition for the classification as the first token, the second token is a token which matches none of the pieces of dictionary data D or a token which matches pieces of the dictionary data D the number of which is less than the threshold value.

For example, the matching execution module 102 determines whether or not each token matches the words stored in the dictionary data D, to thereby execute the matching. That is, the matching execution module 102 determines whether or not a word matching each token exists in the dictionary data D. In the at least one embodiment, a case in which complete match is determined is described, but partial match may be determined. The partial match may be any one of forward match, middle match, or backward match. In the at least one embodiment, as an example of the matching, description is given of a method of searching for a matching character starting from the left most character of a string (so-called left-most longest match).

For example, it is assumed that the user inputs a query "Dinner Ita Tian Tokyorestaurant." In this case, it is considered that the user erroneously inputs a space between "Ita" and "lian," and does not input a space between "Tokyo" and "restaurant." This query is to be formatted into a query "Dinner Italian Tokyo restaurant."

The token acquisition module 101 acquires four tokens "Dinner," "Ita," "lian," and "Tokyoresutaurant" based on the positions of the spaces in the query "Dinner Ita lian Tokyorestaurant." The matching execution module 102 executes the matching between each of those four tokens and the dictionary data D. It is assumed that words "Dinner," "Italian," "Tokyo," and "restaurant" are stored in the dictionary data D.

The first token "Dinner" exists in the dictionary data D, and hence the matching execution module 102 classifies this token as the first token. The space is arranged between the second token "Ita" and the third token "lian," but the second token "Ita" and the third token "lian" match a word "Italian" through the so-called left-most longest match, and hence the matching execution module 102 classifies those two tokens as the first token. The fourth token "Tokyorestaurant" is a combination of a word "Tokyo" and a word "restaurant" of the dictionary data D, but do not match the word "Tokyo" and the word "restaurant" through the left-most longest match, and hence the matching execution module 102 classifies this token as the second token.

In the at least one embodiment, the matching execution module 102 uses the first dictionary data D1, the second dictionary data D2, and the third dictionary data D3 to execute the above-mentioned matching. For example, as illustrated in FIG. 4, a query being an input sequence is represented by "x." A token included in the query "x" is represented by $x_i$ ("i" is a natural number equal to or smaller than "1" (alphabetic letter) described later). When the total number of tokens is represented by "1" ("1" is an integer equal to or larger than 2), $x=x_1 \ldots x_1$.

For example, a formatted query is represented by "y." The formatted query "y" can also be considered as a sequence of formatted tokens. To obtain the formatted query "y" from the query "x" is one of purposes of the query formatting system S. The token included in the formatted query "y" is represented by $y_1$ (I is a natural number equal to or smaller than L described later). When the total number of tokens included in the formatted query "y" is represented by L (L is an integer equal to or larger than 2), $y=y_1 \ldots y_L$.

For example, a sequence of operations in the query formatting is represented by "o." The operation "o" is a set of operations of for the tokens $x_i$. Thus, $o=o_1 \ldots o_1$. As described above, in the at least one embodiment, the three operations of the splitting, the merging, and the segmentation are exemplified, and hence the operation $o_i$ is "Split," "Merge," "Segment," or "Single." The label "Single" is added to a token $x_i$ which does not require the operation. Those four operations can be considered as labels indicating the operation contents.

When the token $x_i$ is a first token, the operation $o_i$ is "Split," "Merge," "Segment," or "Single." That is, to add any one operation $o_i$ of those four operations corresponds to classification of the token $x_i$ as the first token. When the token $x_i$ is a second token, the operation $o_i$ is "Uncertain," which is none of those four operations. The label "Uncertain" can be considered as a tentative label. That is, to add the operation $o_i$ "Uncertain" corresponds to classification of the token $x_i$ as the second token.

As illustrated in FIG. 4, the matching execution module 102 executes the matching between the token $x=x_1 \ldots x_1$ and the first dictionary data D1. For example, it is assumed that the token $x_3$ and the token $x_4$ match a word of the first dictionary data D1. In the above-mentioned example, the token $x_3$ being "Ita" and the token $x_4$ being "lian" match one word "Italian" stored in the first dictionary data D1. The matching execution module 102 classifies the tokens $x_3$ and $x_4$ as first tokens to be merged. That is, the matching execution module 102 sets each of the operations $o_3$ and $o_4$ to "Merge."

The matching execution module 102 extracts the tokens $x_3$ and $x_4$ matching the first dictionary data D1 from the query x when the matching which uses the first dictionary data D1 is completed. As illustrated in FIG. 4, a target of the matching with the second dictionary data D2 is a query $x=x_1, x_2, x_5, \ldots, x_1$. For example, it is assumed that the token $x_2$ matches a word of the second dictionary data D2. In the above-mentioned example, the token $x_2$ being "Dinner" matches one word "Dinner" of the second dictionary data D2. The matching execution module 102 classifies the token $x_2$ as a first token which does not require the operation. That is, the matching execution module 102 sets the operation $o_2$ to "Single."

The matching execution module 102 extracts the token $x_2$ matching the second dictionary data D2 from the query x when the matching which uses the second dictionary data D2 is completed. As illustrated in FIG. 4, a target of the matching with the third dictionary data D3 is a query $x=x_1, x_5 \ldots x_i$. For example, when it is assumed that the token $x_1$ matches a suffix of the third dictionary data D3, the matching execution module 102 classifies the token $x_1$ as the first token which does not require the operation. That is, the matching execution module 102 sets the operation $o_i$ to "Single." Morpheme analysis may be applied to the query x before the matching with the third dictionary data D3, and the query x may be decomposed into morphemes. In the matching which uses the third dictionary data D3, the matching may be executed after an index such as a co-occurrence scale is calculated.

Each of the tokens $x_5 \ldots x_i$ matches none of the pieces of dictionary data D, and hence the matching execution module 102 classifies the tokens $x_5 \ldots x_i$ as the second tokens. That is, the matching execution module 102 sets the operations $o_5 \ldots o_1$ to "Uncertain." The matching is now completed. When reference to FIG. 4 is not particularly required in the following description, reference symbols of the query, the token, and the like are omitted.

In the at least one embodiment, it is assumed that the operation "Split" is not added through the matching, but the operation "Split" may be added through the matching. Moreover, in the example of FIG. 4, there is described the case in which the token matching the dictionary data D is extracted from the query, but even the matching token is not required to be extracted from the query. For example, the matching execution module 102 may execute the matching between the token matching the first dictionary data D1 with the second dictionary data D2 and the third dictionary data D3.

[Determination Module]

The determination module 103 determines whether or not all of the plurality of tokens acquired by the token acquisition module 101 match the dictionary data D. That is, the determination module 103 determines whether or not a token not matching the dictionary data D exists in the plurality of tokens. It can be considered that the determination module 103 determines whether or not all of the plurality of tokens are first tokens or whether or not a second token exists in the plurality of tokens.

In FIG. 4, the determination "having 'Uncertain' label?" corresponds to processing of the determination module 103. A state in which a token $x_i$ having the operation $o_i$ being "Uncertain" does not exist in the query x for which the matching up to the third dictionary data D3 has been completed corresponds to a state in which all tokens $x_i$ match the dictionary data D. The determination module 103 determines whether or not all tokens $x_i$ match the dictionary data D based on the operation $O=o_1 \ldots o_1$. In the example of FIG. 4, the tokens $x_5 \ldots x_1$ do not match the dictionary data D, and hence the tokens "having 'Uncertain' label" exist. Consequently, the determination processing of FIG. 4 is "Y."

[First Token Formatting Module]

The first token formatting module 104 formats the first token based on the execution result of the matching. In the at least one embodiment, a first token having the label "Single" is not formatted. Thus, the first token formatting module 104 formats first tokens which are required to be formatted among the plurality of first tokens based on the execution result of the matching. The first token required to be formatted is a first token having the added operation $o_i$ other than "Single." In the at least one embodiment, "Split" is not added in the matching with the dictionary data D, and hence the first token formatting module 104 formats first tokens having the added operation "Merge" or the added operation "Segment."

For example, when "Merge" is added to a plurality of first tokens continuous to each other, the first token formatting module 104 formats those plurality of first tokens such that spaces between the first tokens are deleted and one token is formed. In the case of the above-mentioned two first tokens "Ita" and "lian," the first token formatting module 104 formats those two first tokens such that the space between "Ita" and "lian" is deleted and one token "Italian" is formed.

For example, when "Segment" is added to a plurality of first tokens continuous to each other, the first token formatting module 104 formats those plurality of first tokens such that one token is formed without deleting spaces between the first tokens. In the case of the above-mentioned three first tokens "The," "South," and "Mountain," the first token formatting module 104 formats those three first tokens such that one token "The South Mountain" is formed without deleting the spaces between "The," "South," and "Mountain." The first token after being formatted may be enclosed by symbols, such as quotation marks or double quotation marks, to indicate that the first token has been segmented.

In the example of FIG. 4, "Merge" is added to the tokens $x_3$ and $x_4$, and hence the first token formatting module 104 deletes the space between the tokens $x_3$ and $x_4$ so that those two tokens are merged into one token. In the example of FIG. 4, the query formatted by the first token formatting module 104 is represented by $x_{r}$ ("r" is a natural number equal to or smaller than "m" described later). Here, $x_r=x_1 x_2 \ldots x_m$ ("m" is an integer equal to or larger than 2). In this case, the tokens $x_3$ and $x_4$ are merged. Thus, the number of tokens is reduced by one, and hence the value of "m" is smaller than "1" by 1.

As the formatting method itself, various methods can be used. For example, when matching which can add "Split" to a first token is executed, the first token formatting module 104 may format this first token such that the first token to which "Split" is added is split into a plurality of tokens. For example, when an operation added through use of a certain piece of dictionary data D and an operation added through use of other pieces of dictionary data D are different from each other, an operation may be determined through the decision by majority. As another example, the operation may be determined in accordance with a priority specified for the dictionary data D.

[Second Token Formatting Module]

The second token formatting module 105 formats the second tokens which do not match the dictionary data D among the plurality of tokens based on the first tokens which match the dictionary data D among the plurality of tokens and the learning models M relating to the query formatting. The learning models M refer to not only information on the second tokens themselves but also information on the first tokens in order to format the second tokens. That is, the learning models M refer to not only the second tokens, but also the execution result of the matching, to thereby format the second tokens. The learning models M can consider not only the features of the characters of the token, but also which tokens match the dictionary data D. The second token formatting module 105 changes an internal calculation result of the learning models M or the output from the learning models M through use of the information on the first tokens, to thereby format the second tokens.

In the at least one embodiment, a plurality of types of operations are prepared as operations for the second token, and hence the second token formatting module 105 selects any one of the plurality of operations based on the first tokens and the learning models M. The second token formatting module 105 formats the second token based on the selected operation. For example, the second token formatting module 105 selects any one of the four operations "Split," "Merge," "Segment," and "Single." The operations for the first tokens and the operations for the second tokens may be different from each other. The second token formatting module 105 may select an operation to be applied to the second token from three or two of those four operations.

In the at least one embodiment, when the first tokens are formatted by the first token formatting module 104, the second token formatting module 105 formats the second tokens based on the formatted first tokens and the learning models M. That is, for the formatted first tokens, the learning models M refer to the information on the first tokens in the formatted state to use this information to format the second tokens. In the example of FIG. 4, the first tokens $x_3$ and $x_4$ to which "Merge" is added are formatted into the one token, and hence the information on the one first token obtained by formatting those first tokens is referred to by the learning models M.

For example, when only some of the plurality of first tokens are formatted, the second token formatting module 105 formats the second tokens based on the formatted first tokens, the unformatted first tokens, and the learning models M. In this case, the learning models M refer to both of the information on the formatted first tokens and the information on the unformatted first tokens. In the example of FIG. 4, the first tokens $x_1$ and $x_2$ to which "Single" is added are not formatted and the first tokens $x_3$ and $x_4$ to which "Merge" is added are formatted, and hence the information on both of those first tokens are referred to by the learning models M.

In the at least one embodiment, when the query $x_r=x_1 x_2 \ldots x_m$ to which "Uncertain" is added is given, each of characters which is included in the tokens to which "Uncertain" is added is classified as any one of "B," "I," "O," "E," and "S." This classification is sometimes referred to as "BIOES chunking." The attribute "B" means a beginning of a word. The attribute "I" means an inside of a word. The attribute "E" means an end of a word. The attribute "S" means being a single word. The attribute "O" means a blank.

For example, it is assumed that a character sequence of a query $x_r$ including spaces is $c=c_{1,1} \ldots c_{m,n}$. In this case, $c_{i,j}$ is a j-th character in an i-th token. For example, when the i-th token is "Dinner," $c_{i,1}$ is "D," $c_{i,2}$ is "i," $c_{i,3}$ is "n," $c_{i,4}$ is "n," $c_{i,5}$ is "e," and $c_{i,6}$ is "r."

In the example of FIG. 4, it is assumed that an output sequence of the learning models M is $z=z_{1,1} \ldots z_{m,n}$. In this case, $z_{i,j}$ is the attribute of the character $c_{i,j}$. That is, $z_{i,j}$ is any one of "B," "I," "O," "E," and "S." The machine learning method at the second stage 2 solves a task of predicting the output sequence $z=z_{1,1} \ldots z_{m,n}$ from the character sequence $c=c_{1,1} \ldots c_{m,n}$. The second token formatting module 105 updates the label "Uncertain" of the token to any one of the labels "Split," "Merge," "Segment," and "Single" based on the output sequence "z."

In the at least one embodiment, the machine learning method at the second stage 2 is formed of four layers being a layer corresponding to acquisition of character feature amounts of the character sequence "c," a layer corresponding to connection to the token feature amounts in consideration of the execution result of the matching, a fully-connected layer, and a CRF layer. It is assumed that those four layers are included in the first learning model M1, but may be distributed to a plurality of learning models M. The second learning model M2 is used to calculate the token feature amounts in the layer at the second stage. The token feature amounts may be calculated not by the second learning model M2, but by the layer of the first learning model M1.

"CLS" and "SEP" of FIG. 4 are strings indicating a beginning and an end, respectively. It is assumed that feature amounts are calculated also for those strings. Moreover, in the at least one embodiment, it is assumed that the second token formatting module 105 inputs not only the character sequence "c," but also the operation sequence "o" to the first learning model M1. However, the second token formatting module 105 is not required to input a part of the operation sequence "o" to the first learning model M1. For example, the second token formatting module 105 may input, to the first learning model M1, only the operations of for the first tokens among the operation sequence "o." For example, the second token formatting module 105 calculates, for each first character included in the first token, a first character feature amount relating to a feature of the first character based on the first learning model M1. The first character is each character included in the first token. In the example of FIG. 4, the first tokens $x_1$, $x_2$, $x_3$, and $x_4$ exist (however, the first tokens $x_3$ and $x_4$ are merged into the one token), and hence each of the characters included therein corresponds to a first character. In FIG. 4, a hatched background is added to each of boxes relating to the first characters.

For example, when the first token $x_1$ includes first characters $c_{1,1}$ and $c_{1,2}$, the second token formatting module 105 calculates a first character feature amount $h_{1,1}$ of the first character $c_{1,1}$ and a first character feature amount $h_{1,2}$ of the first character $c_{1,2}$ based on the first learning model M1. The second token formatting module 105 similarly calculates a first character feature amount of each of other first characters included in other first tokens. This calculation method itself may be a publicly-known method. In the at least one embodiment, the first learning model M1 is finely-tuned CharacterBERT, and hence the first character feature amount is calculated based on a calculation method defined by CharacterBERT.

For example, the second token formatting module 105 calculates, for each second character included in the second token, a second character feature amount relating to a feature of the second character based on the first learning model M. The second character is each character included in the second token. In the example of FIG. 4, the second tokens $x_5, \ldots, x_m$ exist, and hence each of the characters included therein corresponds to a second character. In the example of FIG. 4, the second token $x_5$ includes a plurality of second characters such as a character $c_{5,1}$.

The second token formatting module 105 calculates a second character feature amount $h_{5,1}$ of the character $c_{5,1}$ based on the first learning model M1. The second token formatting module 105 similarly calculates a second character feature amount of each of other second characters included in other second tokens. This calculation method may also be a publicly-known method as for the first character feature amount. In the example of FIG. 4, the second token formatting module 105 acquires character feature amounts $H=[h_{[CLS]}, h_{1,1}, \ldots, h_{m,1}, h_{[SEP]}]$ including the first character feature amounts and the second character feature amounts based on the first learning model M1. In this case, $h_{i,j}$ is a character feature amount corresponding to the character $c_{i,j}$.

For example, the second token formatting module 105 obtains a first token feature amount calculated based on a predetermined calculation method, and relating to a feature of the first token itself. In the at least one embodiment, this calculation method is a method of using the second learning model M2 which calculates a feature amount of an input string. The second learning model M is an example of a calculation model. Thus, a section describing the second learning model M can be read as the calculation model. The second token formatting module 105 acquires the first token feature amount calculated by the second learning model M2.

In the example of FIG. 4, the second token formatting module 105 acquires a first token feature amount $w_1$ of the token $x_1$ including the first characters $c_{1,1}$ and $c_{i,2}$ based on the second learning model M2. The first token feature amount $w_1$ is common to those two first characters $c_{1,1}$ and $c_{i,2}$. The second token formatting module 105 similarly acquires a first token feature amount for each of other first tokens. The calculation method for the first token feature amount by the second learning model M2 may be a publicly-known method. For example, the second character feature amount is calculated based on a calculation method defined by BERT, Bi-LSTM, Bi-LSTM-CRF, Word2Vec, or the like.

For example, the second token formatting module 105 formats the second tokens based on the first character feature amounts, the first token feature amounts, and the second character feature amounts. For example, the second token formatting module 105 calculates, for each first character, an average of the first character feature amount of this first character and the first token feature amount, and formats the second tokens based on the calculated averages and the second character feature amounts.

In the example of FIG. 4, the second token formatting module 105 calculates an average of the first character feature amount $h_{1,1}$ of the character $c_{1,1}$ and the first token feature amount $w_1$. In this case, the average is the simple average. The second token formatting module 105 calculates an average of the first character feature amount $h_{1,2}$ of the character $c_{1,2}$ and the first token feature amount $w_1$. The second token formatting module 105 similarly calculates, for each of other first characters, an average of the first character feature amount and the first token feature amount.

As illustrated in FIG. 4, the second token formatting module 105 formats the second token not based on second token feature amounts relating to the second tokens themselves, but based on the first character feature amounts, the first token feature amounts, and the second character feature amounts. In the example of FIG. 4, for the second character feature amount of the character $c_{5,1}$ of the second token $x_5$, an average of this second character feature amount and a feature amount of the second token $x_5$ itself is not calculated. Similarly for the other second tokens, the second token formatting module 105 does not calculate an average of the second character feature amount and the second token feature amount, and directly uses the second character feature amount.

In the example of FIG. 4, the second token formatting module 105 inputs the character feature amounts $H=[h_{[CLS]}, h_{1,1}, \ldots, h_{m,1}, h_{[SEP]}]$ after the calculation of the averages to the fully-connected layer and the CRF layer of the first learning model M1. From the CRF layer, a labeling result for each character being one of "B," "I," "O," "E," and "S" is output. That is, the second token formatting module 105 executes the labeling relating to the query formatting for each second character included in the second tokens based on the first tokens and the learning models M, and formats the second tokens based on the execution result of the labeling. In the at least one embodiment, addition of any one of the attributes "B," "I," "O," "E," and "S" to each character corresponds to the labeling.

FIG. 5 is a diagram for illustrating an example of the output from the first learning model M1. In FIG. 5, output of the first learning model M1 for each of the token "Tokyorestaurant" and the token "championship" is illustrated. For the convenience of description, it is assumed that both of those tokens are second tokens, but the same output may be obtained even when both of those tokens are first tokens.

As illustrated in FIG. 5, in the at least one embodiment, the first learning model M1 outputs split requirement information relating to whether or not the second token is to be split. The above-mentioned "B," "I," "O," "E," and "S" are an example of the split requirement information. The second token formatting module 105 formats the second token based on the split requirement information. For example, the second token formatting module 105 determines to split a token having the split requirement information output from the first learning model M1 indicating that the split is required. The second token formatting module 105 determines not to split a token having the split requirement information output from the first learning model M1 indicating that the split is not required.

The token "Tokyorestaurant" is formed of 15 characters (15 alphabets), and hence the first learning model M1 identifies 15 attributes. The attribute of each character is as illustrated in FIG. 5. The first learning model M1 estimates a portion from a character having a first attribute B to a character having a subsequent attribute E ("Tokyo" from the first "T" to the fifth "o") as one token. The first learning model M1 estimates a portion from a character having a next attribute B to a character having a subsequent attribute E ("restaurant" from the sixth "r" to the fifteenth "t") as one token.

The first learning model M1 estimates that the two tokens exist in the input one token "Tokyorestaurant," and hence outputs the split requirement information indicating that the token "Tokyorestaurant" is to be split. The first learning model M1 may output each estimated token. In this case, the first learning model M1 also executes the splitting of the token "Tokyorestaurant." The first learning model M1 may split the token "Tokyorestaurant" into the two tokens, to thereby output the token "Tokyo" and the token "restaurant."

The token "championship" is formed of 12 characters (12 alphabets), and hence the first learning model M1 identifies 12 attributes. The attribute of each character is as illustrated in FIG. 5. The first learning model M1 estimates a portion from a character having a first attribute B to a character having a subsequent attribute E ("championship" from the first "c" to the twelfth "p") as one token. The first learning model M1 estimates that the input one token "championship" is one token, and hence outputs the split requirement information indicating that the token "championship" is not to be split.

As described above, the first learning model M1 estimates a portion from a character having the attribute "B" to a character having the subsequent attribute "E" as one token. The first learning model M1 also estimates a character having the attribute "S" as one token. The first learning model M1 outputs the split requirement information indicating that input one token is to be split when a plurality of tokens are estimated to exist in the input one token (for example, a plurality of pairs of a character having the attribute B and a character having the attribute E exist). The first learning model M1 outputs the split requirement information indicating that input one token is not to be split when one token is estimated to exist in the input one token (for example, only one pair of a character having the attribute B and a character having the attribute E exists).

The second token formatting module 105 may use the dictionary data D to split the second token having the split requirement information indicating that the split is required, to thereby format the second token. In the at least one embodiment, description is given of a case in which the first dictionary data D1 is used, but the second token formatting module 105 may use the second dictionary data D2 or the third dictionary data D3 to split the second token. When the split requirement information indicates that a certain second token is to be split, the second token formatting module 105 determines whether or not this second token and the first dictionary data D1 partially match each other. When a word partially matching the second token exists in the first dictionary data D1, the second token formatting module 105 splits this token so that this token includes a token formed of this word and tokens formed of the other portions.

In the at least one embodiment, the second token formatting module 105 does not execute the formatting for second tokens when the determination module 103 determines that all of a plurality of tokens match the dictionary data D. In this case, all of the plurality of tokens are first tokens. Thus, even when it is required to format the first tokens, the query formatting can be completed by only the first token formatting module 104. The second token formatting module 105 formats a second token when the determination module 103 determines that only some of the plurality of tokens match the dictionary data D.

The second token formatting module 105 is only required to format the second token based on the execution result of the matching and the learning models M. The formatting method for the second token is not limited to the example in the at least one embodiment. For example, when the function of the first learning model M1 and the function of the second learning model M2 are unified into one learning model M, the second token formatting module 105 may format the second token based on this one learning model M.

Moreover, for example, the second token may be formatted focusing not on the characters included in the token, but on morphemes included in the token. In this case, the second token formatting module 105 executes morpheme analysis for the first tokens and the second tokens. As the morpheme analysis itself, publicly-known various methods can be used. The morpheme may be one character, or may include a plurality of characters. In this case, the morpheme included in the first token is referred to as "first morpheme." The morpheme included in the second token is referred to as "second morpheme."

The second token formatting module 105 calculates, based on the learning models M, a first morpheme feature amount relating to a feature of the first morpheme and a second morpheme feature amount relating to a feature amount of the second morpheme. The second token formatting module 105 calculates an average of the first morpheme feature amount and the first token feature amount. The second token formatting module 105 inputs the calculated average and the second morpheme feature amount to the fully-connected layer and the CRF layer, to thereby execute labeling of the second morphemes. The second token formatting module 105 formats the second token based on an attribute added to the second morpheme.

Moreover, for example, the second token formatting module 105 may directly input formatted first tokens and second tokens into the learning models M. In this case, the second token formatting module 105 calculates the first token feature amounts of the formatted first tokens and the second token feature amounts relating to the features of the second tokens based on the learning models M. The second token formatting module 105 inputs the first token feature amounts and the second token feature amounts to the fully-connected layer and the CRF layer, to thereby execute labeling of the second tokens. The second token formatting module 105 formats the second tokens based on the attributes added to the second tokens.

[Formatted Query Acquisition Module]

The formatted query acquisition module 106 acquires the formatted query "y" based on the execution result of the matching which uses the dictionary data D and the results of processing which uses the learning models M. For example, when both of the formatting of the first tokens and the formatting of the second tokens are executed, the formatted query acquisition module 106 acquires the formatted query "y" including the formatted first tokens and the formatted second tokens. For example, when the formatting of the first tokens is not executed, and only the formatting of the second tokens is executed, the formatted query acquisition module 106 acquires the formatted query "y" including the unformatted first tokens and the formatted second tokens.

For example, when the formatting of the first tokens is executed, and the formatting of the second tokens is not executed, the formatted query acquisition module 106 acquires the formatted query "y" including the formatted first tokens and the unformatted second tokens. For example, when none of the formatting of the first tokens and the formatting of the second tokens are executed, the formatted query acquisition module 106 acquires the formatted query "y" including the unformatted first tokens and the unformatted second tokens.

[Search Module]

The search module 107 executes search processing based on the formatted second tokens. The search module 107 is only required to execute the search processing based on at least the formatted second tokens. In the at least one embodiment, the formatted query acquisition module 106 acquires the formatted query "y." Thus, the search module 107 executes the search processing based on the search target database DB and the formatted query "y." The search module 107 compares indices stored in the search target database DB and the formatted query "y" with each other, to thereby execute the search processing. As the search processing itself, publicly-known various methods can be used. For example, when a plurality of tokens are included in the formatted query "y," the search module 107 executes the search processing under the OR condition of the plurality of tokens. In the example of FIG. 2, the query formatting is not applied to the query "Tokyo restaurant" and the query "U.S.A. championship," and hence the search module 107 executes the search processing directly based on those queries.

Meanwhile, the query "Tokyorestaurant" of FIG. 2 is split into the token "Tokyo" and the token "restaurant." Thus, the search module 107 executes the search processing based on the query "Tokyo restaurant" formatted so that this query is split into (a space is embedded between) those two tokens. In the case of the query "U.S.A. champion ship," the token "U.S.A." is not to be formatted. However, the token "champion" and the token "ship" are merged into "championship." Thus, the search module 107 executes the search processing based on the query "U.S.A. championship" formatted so that those two tokens are merged into one token (a space does not exist therebetween).

[Presentation Module]

The presentation module 108 presents an execution result of the search processing to the user who has input the query. In the at least one embodiment, description is given of a case in which the execution result is visually presented through use of an image, but the execution result may auditorily be presented through use of sound. The execution result of the search processing is a list of indices hit through the search. For example, the presentation module 108 generates display data (for example, HTML data) for a screen including the execution result of the search processing, and transmits the display data to the user terminal 20.

[4. Processing Executed in Query Formatting System]

FIG. 6 is a flowchart for illustrating an example of processing executed in the query formatting system S. The processing is executed by the control units 11 and 21 operating in accordance with the programs stored in the storage units 12 and 22, respectively.

The user terminal 20 accesses the server 10 when the user selects a link to the top page P1 or the like, and displays the top page P1 of the search service on the display unit 25 (Step S1). The user terminal 20 receives input of a query to the input form F10 based on an operation $o_i$ the user from the operation unit 24 (Step S2). The user terminal 20 transmits the query input by the user to the server 10 (Step S3).

When the server 10 receives the query from the user terminal 20 (Step S4), the server 10 acquires a plurality of tokens included in the query (Step S5). The server 10 executes matching through use of the dictionary data D based on the plurality of tokens (Step S6). In Step S6, the server 10 executes the matching through use of each of the first dictionary data D1 to the third dictionary data D3 based on the plurality of tokens through the flow described with reference to FIG. 4.

The server 10 formats the first tokens based on the execution result of the matching executed in Step S6 (Step S7). The server 10 determines whether or not all of the plurality of tokens match the dictionary data D (Step S8). When it is determined that all of the plurality of tokens match the dictionary data D (Y in Step S8), the processing step of Step S13 is executed without execution of the processing steps of from Step S9 to Step S12. That is, second tokens do not exist in the query, and hence the search processing is executed based on the formatted first tokens.

Meanwhile, when it is not determined that all of the plurality of tokens match the dictionary data D (N in Step S8), the server 10 calculates the character feature amounts based on the first learning model M1 (Step S9). In Step S9, the server calculates the first character feature amounts and the second character feature amounts. The server 10 calculates the first token feature amounts based on the second learning model M2 (Step S10). The server 10 calculates the average of the first character feature amount of each first character and each first token feature amount (Step S11). The server 10 formats the second tokens based on the averages calculated in Step S11 and the second character feature amounts of the second characters (Step S12).

The server 10 acquires the formatted query based on the processing result obtained in at least one of Step S7 or Step S12, and executes the search processing of the search target database DB (Step S13). The server 10 transmits a search result obtained in Step S13 to the user terminal 20 (Step S14). When the user terminal 20 receives the search result data from the server 10, the user terminal 20 displays the search result on the display unit 25 (Step S15), and this processing is finished.

According to the query formatting system S of the at least one embodiment, the matching is executed through use of the dictionary data D based on the plurality of tokens included in the query. The query formatting system S formats second tokens which do not match the dictionary data D based on first tokens which match the dictionary data D and the learning models M. As a result, the second tokens can accurately be formatted by using the execution result of the matching in the machine learning method, and hence the precision of the query formatting increases. For example, when the user inputs a query through copy and paste, spaces are likely to be included in the query on the whole. In this case, when the label of the first token is "Merge," the label of the second token may also be "Merge." Moreover, for example, when an honest user manually inputs a query, tokens included in the query may be correct on the whole. In this case, when the label of the first token is "Single," the label of the second token may also be "Single." Thus, for example, the learning models M can consider the fact that the same tendency as that of the first token may exist in the second token through the machine learning method in consideration of the execution result of the matching. Accordingly, the accuracy of the query formatting increases.

Moreover, the query formatting system S formats the second tokens based on the formatted first tokens and the learning models M. As a result, both of the first tokens and the second tokens can be formatted, and hence the accuracy of the query formatting increases more. Further, it is possible to cause the learning models M to consider more accurate information by using the formatted first tokens, and hence the accuracy of the query formatting increases more.

Moreover, when only some of the plurality of first tokens are formatted, the query formatting system S formats the second tokens based on the formatted first tokens, the unformatted first tokens, and the learning models M. As a result, when a first token which is not required to be formatted exists, it is possible to cause the learning models M to consider also the information on this first token, and hence the accuracy of the query formatting increases more.

Moreover, the query formatting system S calculates, for each second character included in a second token, a second character feature amount relating to the feature of this second character based on the learning model M, to thereby format the second token based on the first character feature amounts, the first token feature amounts, and the second character feature amount. As a result, the second token can be formatted based on the characters in smaller units, and hence the accuracy of the query formatting increases more. The feature amount used for the query formatting can also be calculated based on the character in a smaller unit, and hence the query formatting is executed by considering a relationship between the characters in more detail, with the result that the accuracy of the query formatting increases more.

Moreover, the query formatting system S acquires the first token feature amounts calculated by the second learning model M2. As a result, the second learning model M2 dedicated to calculating the first token feature amounts can be used, and hence the more accurate first token feature amounts are calculated, with the result that the accuracy of the query formatting increases more. The roles can be distributed between the first learning model M1 and the second learning model M2, and hence a speed of the query formatting can be increased. For example, when the query formatting is used in the real-time search processing as in the at least one embodiment, a time required to present the search result can be reduced by executing the respective pieces of processing of the first learning model M1 and the second learning model M2 in parallel.

Moreover, the query formatting system S formats the second tokens based on the averages of the first character feature amounts and the first token feature amounts and the second character feature amounts. As a result, the first token feature amounts are used to cause the learning models M to consider the information obtained through the matching, and hence the accuracy of the query formatting increases more. Moreover, a calculation amount of the processing itself of calculating the averages is small, and hence a processing load on the server 10 can be reduced. The speed of the query formatting can be increased by employing the processing having a small calculation amount.

Moreover, the query formatting system S formats the second tokens not based on the second token feature amounts relating to the feature of the second tokens themselves, but based on the first character feature amounts, the first token feature amounts, and the second character feature amounts. As a result, inappropriate embedded representation can be avoided while causing the learning models M to consider the information obtained through the matching. For example, when the embedded representation of a word is considered for all characters in a sequence labeling task at the character level, the embedded representation of a word having an uncertain label may also be considered. In this respect, the query formatting system S purposely causes the learning models M not to consider the second token feature amounts of the second tokens which have the label "Uncertain" and hence are uncertain, and, consequently, the accuracy of the query formatting increases.

Moreover, the query formatting system S formats the second tokens based on the execution result of the labeling executed for each second character included in the second tokens based on the first tokens and the learning models M. As a result, the second token can be formatted based on the characters in smaller units, and hence the accuracy of the query formatting increases more.

Moreover, the first token is a token which matches at least one of the plurality of pieces of dictionary data D, and the second token is a token which matches none of the plurality of pieces of dictionary data D. Thus, the matching in consideration of the plurality of pieces of dictionary data D comprehensively can be executed, and hence an accuracy of matching increases. As a result, it is possible to cause the learning models M to consider the information obtained through the highly accurate matching, and hence the accuracy of the query formatting increases more.

Moreover, when it is determined that all of the plurality of tokens match the dictionary data D, the query formatting system S does not format second tokens. When it is determined that only some of the plurality of tokens match the dictionary data D, the query formatting system S formats second tokens. As a result, when the query formatting is completed only through the matching, the processing through the machine learning method can be skipped, hence it is not required to execute the unnecessary processing, and the processing load on the server 10 can be reduced. As a result, the speed of the query formatting can be increased.

Moreover, the query formatting system S selects any one of the plurality of operations based on the first tokens and the learning models M, and formats each of the second tokens based on the selected operation. As a result, the query formatting can be executed through use of the plurality of operations, and hence the accuracy of the query formatting increases more. For example, the query formatting can be executed through use of not only the splitting of the token, but also various operations, such as the splitting, the merging, and the segmentation.

Moreover, the query formatting system S formats the second tokens based on the splitting requirement information output from the learning model M. As a result, it is possible to determine whether or not the splitting is to actually be executed, and hence the accuracy of the query formatting increases more. For example, even when the splitting of a token is difficult through use of the matching method, the token can be split through use of the learning models M.

Moreover, the query formatting system S uses the dictionary data D to split a second token having the split requirement information indicating the splitting, to thereby format the second token. As a result, it is possible to determine whether or not the splitting is to actually be executed through use of the dictionary data D, and hence the accuracy of the query formatting increases more.

Moreover, the query formatting system S presents to the user the execution result of the search processing executed based on the formatted second tokens. As a result, the search processing based on the formatted second tokens can be executed, and hence the accuracy of the search processing increases.

[5. Modification Examples]

The present disclosure is not limited to the at least one embodiment described above, and can be modified suitably without departing from the spirit of the present disclosure.

Figure 7:
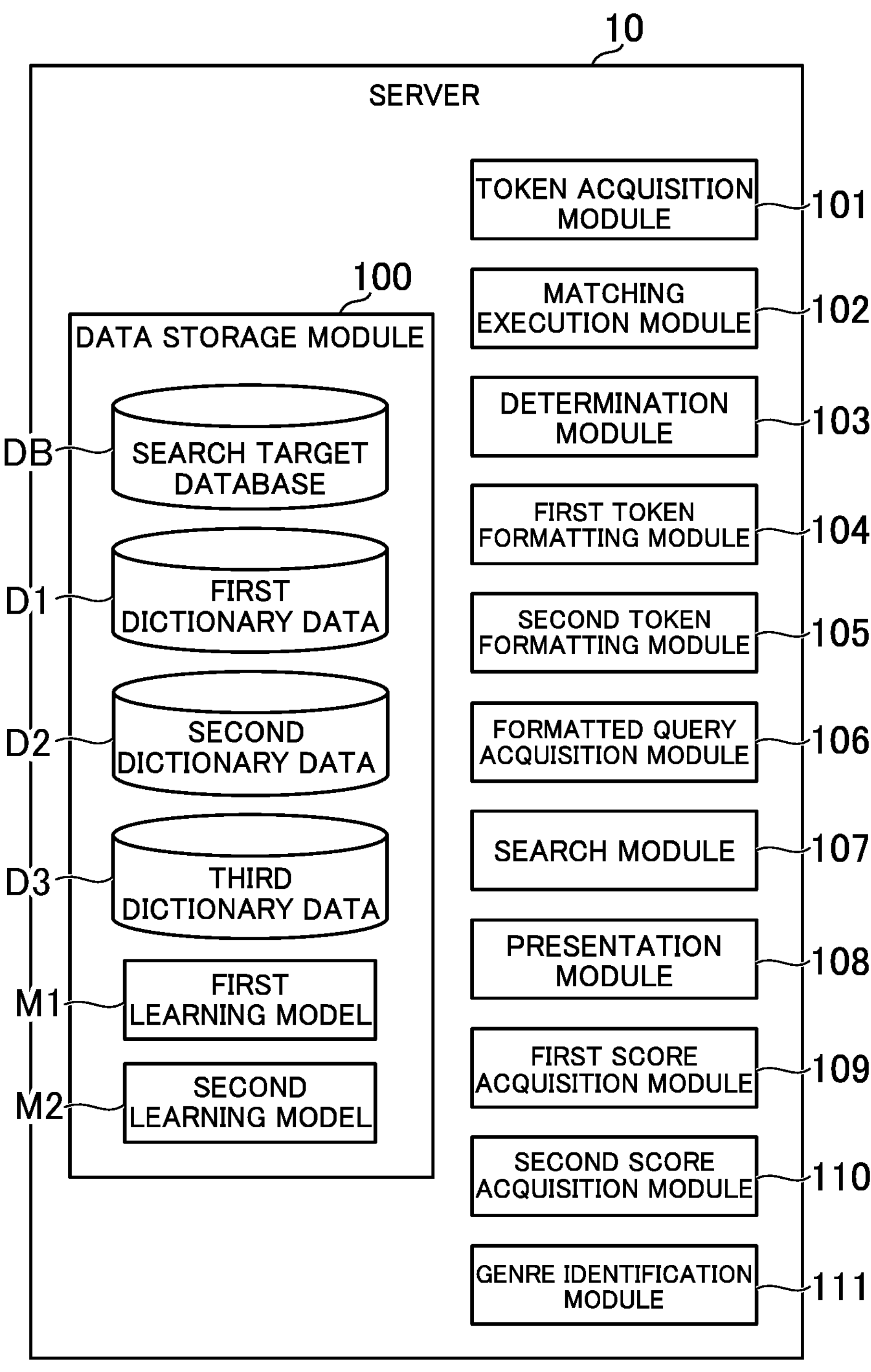
FIG. 7 is a functional block diagram in modification examples of the present disclosure.

FIG. 7 is a functional block diagram in modification examples of the present disclosure. A first score acquisition module 109, a second score acquisition module 110, and a genre identification module 111 are included. Those modules are mainly implemented by the control unit 11.

5-1. Modification Example 1

For example, description has been given of the case in which the simple average of the first character feature amount and the first token feature amount is calculated in the at least one embodiment, but a weighted average thereof may be calculated. For the weighted average, a weighting coefficient is set to at least one of the first character feature amount or the first token feature amount. Description is given of a case in which a weighting coefficient is set to only the first token feature amount in Modification Example 1 of the present disclosure, but a weighting coefficient may be set to only the first character feature amount, or weighting coefficients may be set to both thereof.

The second token formatting module 105 in Modification Example 1 determines the weighting coefficient relating to the average based on the execution result of the matching, and calculates the average based on the weighting coefficient. The execution result of the matching is the accuracy of the matching. For example, in the case of the matching which uses the plurality of pieces of dictionary data D, the number of pieces of dictionary data D which the first token matches corresponds to the execution result of the matching. For example, in a case of matching which permits a partial matching, the number of characters which the first token matches corresponds to the execution result of the matching.

The second token formatting module 105 determines the weighting coefficient such that the first token feature amount is considered more as the accuracy of the matching is higher. In Modification Example 1, the weighting coefficient is set to only the first token feature amount, and hence the second token formatting module 105 determines the weighting coefficient such that the weighting coefficient of the first token feature amount increases as the accuracy of the matching increases. When the weighting coefficient is also set to the first character feature amount, it is only required that the second token formatting module 105 determine the weighting coefficient such that the weighting coefficient of the first character feature amount decreases as the accuracy of the matching increases. The average in Modification Example 1 is different from that in the at least one embodiment in such a point that the weighting coefficient is considered, but other points are equivalent to those of the at least one embodiment.

According to Modification Example 1, the average of the first character feature amount and the first token feature amount is calculated based on the weighting coefficient in accordance with the execution result of the matching. As a result, it is possible to cause the learning models M to more effectively consider the execution result of the matching, and hence the accuracy of the query formatting increases more.

5-2. Modification Example 2

For example, an attribute of the first character included in the first token can also be obtained from the learning models M. In this case, the formatting result of the first token in the matching method and a formatting result of the first token in the learning models M may be different from each other. It is assumed that the formatting result in the matching method is correct in the at least one embodiment. However, when a score of the formatting result in the learning models M is higher, the formatting result in the learning models M may be considered as correct. The query formatting system S according to Modification Example 2 of the present disclosure includes the first score acquisition module 109 and the second score acquisition module 110.

The first score acquisition module 109 acquires a first score relating to the first token based on the execution result of the matching. The first score is the accuracy of the matching described in Modification Example 1. For example, the first score is the number of pieces of dictionary data D which match the first token among the plurality of pieces of dictionary data D. For example, the first score is the number of characters matching the first token. When matching which uses the dictionary data D and a certain learning model which refers to this dictionary data is employed, the first score may be a score calculated by this learning model.

The second score acquisition module 110 acquires a second score relating to the first token based on the processing result of the learning models M. The second score is a score calculated by the learning models M. For example, when the learning models M execute labeling of each character, the learning models M calculate a second score indicating a degree of certainty of the label. This second score is sometimes referred to as "probability." As a calculation method for the score itself, it is only required to use a method used in publicly-known machine learning.

The first token formatting module 104 selects any one of the execution result of the matching and the processing result of the learning models M based on the first score and the second score, to thereby format the first token based on the selected result. For example, the first token formatting module 104 formats the first token based on the execution result of the matching when the first score is higher than the second score. The first token formatting module 104 formats the first token based on the processing result of the learning models M when the second score is higher than the first score. The formatting method for the first token itself based on the processing result of the learning models M is the same as that for the second token, and it is only required that the first token be formatted based on the attributes "B," "I," "O," "E," and "S."

According to Modification Example 2, the first token is formatted based on a method selected based on the first score in accordance with the execution result of the matching and the second score in accordance with the processing result of the learning models M. As a result, the first token can accurately be formatted, and hence the accuracy of the query formatting increases more.

5-3. Modification Example 3

For example, in the at least one embodiment, there has been exemplified the case in which an English query is input in the search service for the websites. The query formatting system S can be applied to a query in any language in any service, and the service and the language are not limited to the examples in the at least one embodiment. In Modification Example 3 of the present disclosure, there is exemplified a case in which a query in Japanese is input in an online shopping service.

The query in Modification Example 3 is input when an online shopping service is searched. The user inputs any query to search for a desired product. The user may specify various attributes, such as a genre, presence or absence of stock, a color, a size, a place of production, a manufacturer, and the like, as one query. The query is input when the online shopping service is searched.

A search target database DB in Modification Example 3 includes information on products being sold in an online shopping mall. For example, the search target database DB stores information, such as shop IDs which can identify shops selling products, product IDs each of which can identify each product, indices which include keywords extracted for the search for the products, product titles, attributes such as product genres, detailed descriptions of the products, images of the products, and prices of the products. The product title is a string expressing a simple description of the product. The product title may be a list of words. The product title, the detailed description of the product, and the like are input by a person in charge of the shop.

For example, the dictionary data D may be created based on tokens included in queries frequently input in the online shopping mall or the product titles on product pages of the online shopping mall. As words in the dictionary data D, the product tiles may directly be stored, or nouns included in the product titles may be stored. As a method of extracting the nouns from the product titles, publicly-known morpheme analysis or the like may be used. In Modification Example 3, description is given of a case in which the dictionary data D is created for each product genre based on the product titles of the products in this product genre, but the dictionary data D may be created independently of product genres in particular.

The query formatting system S according to Modification Example 3 further includes the genre identification module 111 which identifies a product genre corresponding to a query. The product genre is information used to classify a product. The product genre is also referred to as "product category." The product genre is one of the attributes of a product. The product genre corresponding to the query is a product genre associated with the query. For example, when the product genre is included in a query, the product genre included in the query is the product genre corresponding to the query. When the product genre accompanies a query, the product genre accompanying the query is the product genre corresponding to the query.

In Modification Example 3, it is assumed that the user specifies the product genre. For example, the user terminal 20 transmits the product genre specified by the user to the server together with a query. The server 10 receives the product genre and the query from the user terminal 20. The genre identification module 111 acquires the product genre received from the user terminal 20, to thereby identify the product genre. There exists a case in which the user does not specify the product genre. In this case, the processing of the genre identification module 111 is omitted.

The identification method for the product genre is not limited to the above-mentioned example. The genre identification module 111 may identify the product genre based on a token included in a query. In this case, it is assumed that relationships between strings included in tokens and the product genres are defined in the data storage module 100. For example, with a product genre "electric appliance," strings, such as manufacturer names and products names, are associated. Moreover, with a product genre "clothing," strings, such as brand names and sizes, are associated. When a string defined in the above-mentioned relationships is included in the query, the genre identification module 111 acquires a product genre associated with this string, to thereby identify the product genre corresponding to the query.

The matching execution module 102 executes the matching based on the product genre. It is assumed that, for each product genre, dictionary data D created based on product titles of products belonging to this product genre is prepared. The matching execution module 102 executes the matching based on the dictionary data D corresponding to the product genre. The matching execution module 102 uses the product titles in the online shopping service as the dictionary data D to execute the matching.

According to Modification Example 3, the matching is executed based on the product genre corresponding to the query. As a result, it is possible to save time for creating the dictionary data D by reusing the product titles. Moreover, a search accuracy in the online service increases.

Moreover, the query is input when the online shopping service is searched, and the matching execution module 102 uses the product titles in the online shopping service as the dictionary data D to execute the matching. As a result, appropriate query formatting which uses the product genre can be executed, and hence the accuracy of the query formatting effectively increases. For example, when the dictionary data D corresponding to the product genre is used for the matching, it is possible to reduce the number of words to be compared with in the matching, and hence the processing load on the server 10 can be reduced. The speed of the processing can be increased by avoiding unnecessary matching.

5-4. Other Modification Examples

For example, the modification examples described above may be combined.

For example, the query formatting system S can be used for any service other than the search service and the online shopping service. For example, the query formatting system S may be used for search in other services, such as a travel reservation service, an electronic settlement service, a financial service, a communication service, or a content distribution service. Moreover, for example, when a database is searched in a certain single device, the query formatting system S may be used.

For example, the method of causing the learning models M to consider the execution result of the matching is not limited to the example described in the at least one embodiment. For example, the learning model M may calculate the average of the second character feature amount and the second token feature amount, and the weighting coefficient for the second token feature amount in this case may be smaller than the weighting coefficient for the first token feature amount. With this configuration, the first token can be considered more compared with the general Character-BERT. Moreover, for example, without use of the first token feature amount, the first character and the label of the operation added to the first token may be made into feature amounts in a certain way. In this case, the execution result of the matching is reflected in those feature amounts, and hence it is possible to cause the learning models M to consider the execution result of the matching by executing the formatting of the second token based on those feature amounts.

For example, the functions described as being implemented by the server 10 may be implemented by the user terminal 20 or another computer, or may be shared by a plurality of computers. For example, the data to be stored in the data storage module 100 may be stored in a database server.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A query formatting system, comprising at least one processor configured to:

acquire a plurality of first tokens included in a query, where each of the plurality of first tokens includes at least one word or word fragment;

execute matching through use of dictionary data based on the plurality of first tokens;

label each token that matches at least one dictionary data as a first token;

format each first token that matched at least one dictionary data;

label each token that did not match at least one dictionary data as a second token;

input each second token into a learning model to obtain a second label only for each of a plurality of second characters included in the second token;

format the second token based on one of the plurality of first tokens, which matches the dictionary data, and the second label for each of the plurality of second characters;

execute search processing based on the formatted second token;

the least one processor is further configured to:

calculate, for each first character included in the first token, a first character feature amount relating to a feature of the each first character by inputting a first character sequence contained in the first token and a first operation sequence of the query based on the matching into the learning model;

acquire a first token feature amount which is calculated based on a predetermined calculation method, and relates to a feature of the first token itself;

calculate, for the each first character, an average of the first character feature amount of the each first character and the first token feature amount;

calculate, for each second character included in the second token, a second character feature amount relating to a feature of the each second character by inputting a second character sequence contained in the second token and a second operation sequence of the query based on the matching into the learning model;

format the second token based on an output sequence indicating attributes of the characters of the first token and the second token output by the learning model in accordance with the first character feature amount and the second character feature amount after the average has been calculated;

feed a resulting sequence of the feature amounts into a fully-connected layer followed by a conditional random field (CRF) layer of the learning model:

obtain, as the label for each second character, one of the BIOES labels "B", "I", "O", "E", or "S"; and wherein the first tokens are formatted.

2. The query formatting system according to claim 1, wherein the at least one processor is configured to:

format the first token based on an execution result of the matching; and format the second token based on the formatted first token and the learning model.

3. The query formatting system according to claim 2, wherein the at least one processor is configured to:

format, based on the execution result of the matching, a first token that is required to be formatted among a plurality of the first tokens; and format, when only some of the plurality of the first tokens are formatted, the second token based on the formatted first tokens, unformatted first tokens, and the learning model.

4. The query formatting system according to claim 1, wherein the predetermined calculation method is a method of using a calculation model that calculates a feature amount of an input string, and wherein the at least one processor is configured to acquire the first token feature amount calculated by the calculation model.

5. The query formatting system according to claim 1, wherein the at least one processor is configured to:

determine a weighting coefficient relating to the average based on an execution result of the matching; and calculate the average based on the weighting coefficient.

6. The query formatting system according to claim 1, wherein the at least one processor is configured to format the second token not based on a second token feature amount relating to a feature of the second token itself, but based on the first character feature amount, the first token feature amount, and the second character feature amount.

7. The query formatting system according to claim 1, wherein the at least one processor is configured to execute the matching through use of each of a plurality of pieces of the dictionary data, wherein the first token is one of the plurality of tokens which matches at least one of the plurality of pieces of the dictionary data, and wherein the second token is one of the plurality of tokens which fails to match any of the plurality of pieces of the dictionary data.

8. The query formatting system according to claim 1, wherein the at least one processor is configured to:

determine whether all of the plurality of tokens match the dictionary data;

omit the formatting of the second token when the all of the plurality of tokens are determined to match the dictionary data; and format the second token when only some of the plurality of tokens are determined to match the dictionary data.

9. The query formatting system according to claim 1, wherein the at least one processor is configured to:

select any one of a plurality of operations based on the first token and the learning model;

wherein the plurality of operations comprises a split operation, a merge operation, a segment operation, and a single operation; and format the second token based on the selected one of the plurality of operations.

10. The query formatting system according to claim 9, wherein the learning model outputs the one of the plurality of operations.

11. The query formatting system according to claim 1, wherein the at least one processor is configured to:

acquire a first score relating to the first token based on an execution result of the matching;

acquire a second score relating to the first token based on a processing result of the learning model; and select one of the execution result of the matching or the processing result of the learning model based on the first score and the second score, and format the first token based on the selected one of the execution result or the processing result.

12. The query formatting system according to claim 1, wherein the learning model is configured to output splitting requirement information on whether the second token is to be split, and wherein the at least one processor is configured to format the second token based on the splitting requirement information.

13. The query formatting system according to claim 12, wherein the at least one processor is configured to split the second token having the splitting requirement information indicating the splitting through use of the dictionary data, to thereby format the second token.

14. The query formatting system according to claim 1, wherein the query is input when an online shopping service is searched, and wherein the at least one processor is configured to:

identify a product genre corresponding to the query; and execute the matching based on the product genre.

15. The query formatting system according to claim 1, wherein the query is input when an online shopping service is searched, and wherein the at least one processor is configured to execute the matching through use of a product title in the online shopping service as the dictionary data.

16. The query formatting system according to claim 1, wherein the at least one processor is configured to:

present an execution result of the search processing to a user who has input the query.

17. The query formatting system according to claim 1, wherein there are a plurality of pieces of dictionary data; and the first tokens that fail to match at least two pieces of the dictionary data are labeled as second tokens.

18. The query formatting system according to claim 1, wherein said first tokens are formatted without using machine learning.

19. The query formatting system according to claim 1, wherein each first token that matched at least one dictionary data is assigned an operation of "Single", "Merge", or "Segment" and is formatted accordingly, and each second token that did not match at least one dictionary data is assigned the operation "Uncertain".

20. A query formatting method, comprising:

acquiring a plurality of first tokens included in a query, where each of the plurality of first tokens includes at least one word or word fragment;

executing matching through use of dictionary data based on the plurality of first tokens;

labelling each token that matches at least one dictionary data as a first token;

formatting each first token that matched at least one dictionary data;

labelling each token that did not match at least one dictionary data as a second token;

inputting each second token into a learning model to obtain a second label only for each of a plurality of second characters included in the second token;

formatting the second token based on one of the plurality of first tokens, which matches the dictionary data, and the second label for each of the plurality of second characters;

searching based on the formatted second token;

calculating, for each first character included in the first token, a first character feature amount relating to a feature of the each first character by inputting a first character sequence contained in the first token and a first operation sequence of the query based on the matching into the learning model;

acquiring a first token feature amount which is calculated based on a predetermined calculation method, and relates to a feature of the first token itself;

calculating, for the each first character, an average of the first character feature amount of the each first character and the first token feature amount;

calculating, for each second character included in the second token, a second character feature amount relating to a feature of the each second character by inputting a second character sequence contained in the second token and a second operation sequence of the query based on the matching into the learning model;

formatting the second token based on an output sequence indicating attributes of the characters of the first token and the second token output by the learning model in accordance with the first character feature amount and the second character feature amount after the average has been calculated;

feeding a resulting sequence of the feature amounts into a fully-connected layer followed by a conditional random field (CRF) layer of the learning model;

obtaining, as the label for each second character, one of the BIOES labels "B", "I", "O", "E", or "S"; and wherein the first tokens are formatted.

21. A non-transitory information storage medium having stored thereon a program for causing a computer to:

acquire a plurality of first tokens included in a query, where each of the plurality of first tokens includes at least one word or word fragment;

execute matching through use of dictionary data based on the plurality of first tokens;

label each token that matches at least one dictionary data as a first token;

format each first token that matched at least one dictionary data;

label each token that did not match at least one dictionary data as a second token;

input each second token into a learning model to obtain a second label only for each of a plurality of second characters included in the second token;

format the second token based on one of the plurality of first tokens, which matches the dictionary data, and the second label for each of the plurality of second characters;

execute search processing based on the formatted second token;

calculate, for each first character included in the first token, a first character feature amount relating to a feature of the each first character by inputting a first character sequence contained in the first token and a first operation sequence of the query based on the matching into the learning model;

acquire a first token feature amount which is calculated based on a predetermined calculation method, and relates to a feature of the first token itself;

calculate, for the each first character, an average of the first character feature amount of the each first character and the first token feature amount;

calculate, for each second character included in the second token, a second character feature amount relating to a feature of the each second character by inputting a second character sequence contained in the second token and a second operation sequence of the query based on the matching into the learning model;

format the second token based on an output sequence indicating attributes of the characters of the first token and the second token output by the learning model in accordance with the first character feature amount and the second character feature amount after the average has been calculated;

feed a resulting sequence of the feature amounts into a fully-connected layer followed by a conditional random field (CRF) layer of the learning model;

obtain, as the label for each second character, one of the BIOES labels "B", "I", "O", "E", or "S"; and wherein the first tokens are formatted.

* * * * *